(12) United States Patent
Stephenson et al.

(10) Patent No.: US 7,120,906 B1
(45) Date of Patent: Oct. 10, 2006

(54) METHOD AND COMPUTER PROGRAM PRODUCT FOR PRECISE FEEDBACK DATA GENERATION AND UPDATING FOR COMPILE-TIME OPTIMIZATIONS

(75) Inventors: David L. Stephenson, Cambridge, MA (US); Raymond Lo, Sunnyvale, CA (US); Sun Chan, Fremont, CA (US); Wilson Ho, San Mateo, CA (US); Chandrasekhar Murthy, Cupertino, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/560,555

(22) Filed: Apr. 28, 2000

(51) Int. Cl.
*G06F 9/45* (2006.01)

(52) U.S. Cl. ............ 717/158; 717/157; 717/159; 717/154

(58) Field of Classification Search ........ 717/130–132, 717/144–146, 151–161, 140
See application file for complete search history.

(56) References Cited

U.S. PATENT DOCUMENTS

| | | | | |
|---|---|---|---|---|
| 4,656,582 A * | 4/1987 | Chaitin et al. | ............... | 717/146 |
| 4,802,091 A * | 1/1989 | Cocke et al. | ............... | 717/160 |
| 5,347,654 A * | 9/1994 | Sabot et al. | ................ | 717/151 |
| 5,511,198 A * | 4/1996 | Hotta | ......................... | 717/146 |
| 5,613,118 A * | 3/1997 | Heisch et al. | ............... | 717/158 |
| 5,815,720 A * | 9/1998 | Buzbee | ....................... | 717/145 |
| 6,029,004 A * | 2/2000 | Bortnikov et al. | .......... | 717/158 |
| 6,070,009 A * | 5/2000 | Dean et al. | ................. | 717/130 |
| 6,072,951 A * | 6/2000 | Donovan et al. | ........... | 717/158 |
| 6,139,200 A * | 10/2000 | Goebel | ....................... | 717/159 |
| 6,275,981 B1 * | 8/2001 | Buzbee et al. | .............. | 717/158 |
| 6,289,505 B1 * | 9/2001 | Goebel | ........................ | 717/153 |
| 6,308,322 B1 * | 10/2001 | Serocki et al. | .............. | 717/158 |
| 6,308,324 B1 * | 10/2001 | Roediger et al. | ........... | 717/158 |
| 6,327,699 B1 * | 12/2001 | Larus et al. | ................. | 717/128 |

OTHER PUBLICATIONS

Morgan, Robert "Building an Optimizing Compiler" Copyright 1998 by Butterworth-Heinemann, Section 4.1 ' How Are Procedures Stored?' p. 94.*

Aho, Alfred V. "Compilers: Principles, Techniques, and Tools" Copyright 1986 by Addison-Wesley Publishing Company, Chapters 1-5 and 10.*

Albert, E., "A Transparent Method for Correlating Profiles with Source Programs," *2nd ACM Workshop on Feedback-Directed Optimization*, Haifa, Israel, 7 Pages (Nov. 1999).

Ammons, G. et al., "Exploiting Hardware Performance Counters with Flow and Context Sensitive Profiling," *1997 ACM SIGPLAN Conference on Programming Language Design and Implementation*, Las Vegas, Nevada, 12 Pages (Jun. 15-18, 1997).

(Continued)

*Primary Examiner*—Kakali Chaki
*Assistant Examiner*—William H. Wood
(74) *Attorney, Agent, or Firm*—Sterne, Kessler, Goldstein & Fox P.L.L.C.

(57) ABSTRACT

A method and computer program product, within an optimizing compiler, for precise feedback data generation and updating. The method and computer program uses instrumentation and annotation of frequency values to allow feedback data to stay current during the multiple optimizations that the program code undergoes during compilation. Global propagation of known precise feedback values are used to replace approximate and unavailable values, and global verification of feedback data after optimization to detect discrepancies is employed. The method and computer program also provides improved instrumentation to anticipate cloning when code is cloned during ceratin compiler optimizations and handles inlined procedures. The result is compiled executables with improved SPECint benchmarks.

51 Claims, 14 Drawing Sheets

OTHER PUBLICATIONS

Ammons, G. and Larus, J.R., "Improving Data-flow Analysis with Path Profiles," *1998 ACM SIGPLAN Conference on Programming Language Design and Implementation*, Montreal, Canada, 6 Pages (Jun. 17-19, 1998).

Ball, T. and Larus, J.R., "Efficient Path Profiling," *Proceedings of MICRO-29, IEEE*, 12 Pages (Dec. 2-4, 1996).

Ball, T. and Larus, J.R., "Optimally Profiling and Tracing Programs," *Conference Record of the 19th Annual ACM SIGPLAN-SIGACT Symposium on Principles of Programming Languages, ACM Press*, pp. 59-70 (Jan. 19-22, 1992).

Ball, T. and Larus, J.R., "Optimally Profiling and Tracing Programs," *ACM Transactions on Programming Languages and Systems*, vol. 16, No. 4, pp. 1319-1360 (Jul. 4, 1994).

Calder, B. and Grunwald, D., "Reducing Branch Costs via Branch Alignment," *6th International Conference on Architectural Support for Programming Languages and Operating Systems (ASPLOS-VI)*, San Jose California, pp. 242-251 (Oct. 1994).

Chang, P.P. et al., "Using Profile Information to Assist Classic Code Optimizations," *Software-Practice and Experience*, vol. 21, No. 12, 33 Pages (1991).

Chen, W.Y. et al., "Profile-Assisted Instruction Scheduling," *International Journal of Parallel Programming*, vol. 22, No. 2, 34 Pages (Apr. 1994).

Chen, W.Y. et al., "Using Profile Information to Assist Advanced Compiler Optimization and Scheduling," *Adv. in Lang. and Comp. for Par. Proc.*, 18 Pages (date unknown).

Cohn, R. and Lowney, P.G., "Feedback directed optimization in Compaq's compilation tools for Alpha," *2nd ACM Workshop on Feedback-Directed Optimization*, Haifa, Israel, 10 Pages (Nov. 15, 1999).

Conte, T.M. et al., "Hardware-Based Profiling: An Effective Technique for Profile-Driven Optimization," *International Journal of Parallel Programming*, Plenum Publishing, vol. 14, No. 2, pp. 187-206 (Apr. 1996).

Fischer, J.A., "Trace Scheduling: A Technique for Global Microcode Compaction," *IEEE Transactions on Computers*, IEEE Computer Society, vol. C-30, No. 7, pp. 478-490 (Jul. 1981).

Henis, E.A. et al., "Feedback Based Post-link Optimization for Large Subsystems," *2nd ACM Workshop on Feedback-Directed Optimization*, Haifa, Israel, 8 Pages (Nov. 1999).

Larus, J.R. and Schnarr, E., "EEL: Machine-Independent Executable Editing," *Proceedings of the ACM SIGPLAN '95 Conference on Programming Language Design and Implementation (PLDI)*, vol. 30, No. 6, ACM Press, pp. 291-300 (Jun. 18-21, 1995).

Larus, J.R. and Ball, T., "Rewriting Executable Files to Measure Program Behavior," *Software-Practice and Experience*, Jon Wiley & Sons, vol. 24, No. 2, pp. 197-218 (Feb. 1994).

Lowney, P.G. et al., "The Multiflow Trace Scheduling Compiler," *The Journal of Supercomputing*, Kluwer Academic Publishers, pp. 41-142 (Feb.-May 1993).

McFarling, S., "Program Optimization for Instruction Caches," *Proceedings of the 3rd International Conference on Architectural Support for Programming Languages and Operating Systems (ASPLOS)*, ACM Press, pp. 183-191 (May 1989).

Pettis, K. and Hansen, R.C., "Profile Guided Code Positioning," *Proceedings of the ACM SIGPLAN '90 Conference on Programming Language Design and Implementation*, White Plains, New York, ACM Press, pp. 16-27 (Jun 20-22, 1990).

Reps, T. et al., "The Use of Program Profiling for Software Maintenance with Applications to the Year 2000 Problem," *Proceedings of ESEC/FSE 97: Lec. Notes in Comp. Sci.*, Springer-Verlag, 18 Pages (1997).

Srivastava, A. and Eustace, A. ATOM: *A System for Building Customized Program Analysis Tools*, Western Research Laboratory, 27 Pages (Mar. 1994).

Wang, Z., "BMAT—A Binary Matching Tool," *2nd ACM Workshop on Feedback-Directed Optimization*, Haifa, Israel, 10 Pages (Nov. 1999).

Way, T. Pollock, L., "Using Path Spectra to Direct Function Cloning," *Workshop on Profile and Feedback-Directed Compilation*, Paris, France, 7 Pages (Oct. 1998).

Anderson J.M. et al., "Continuous Profiling: Where Have All the Cycles Gone?" *ACM Transactions on Computer Systems*, ACM Press, vol. 15, No. 4, pp. 357-390 (Nov. 4, 1997).

* cited by examiner (pt. 1 of 2)

(pt. 2 of 2)

METHOD AND COMPUTER PROGRAM PRODUCT FOR PRECISE FEEDBACK DATA GENERATION AND UPDATING FOR COMPILE-TIME OPTIMIZATIONS

BACKGROUND OF THE INVENTION

1. Field of the Invention

The present invention relates generally to computer program (i.e., software source code) compilers and more particularly to computer program compilers that perform optimizations.

2. Related Art

Compilation of a computer program consists of a series of transformations from source code through a series of intermediate representations and eventually resulting in binary executables. This series of transformations includes translation and lowering, inlining and linking, and optimizations at all levels.

Optimizing compilers attempt to analyze the software program code in order to produce more efficient executable code. Thus, aggressive compiler optimization is the cornerstone of modern microprocessors. Such compilers may perform one or more of the several types of optimizations which are known to those skilled in the relevant art(s) (e.g., dead code elimination, dead store elimination, branch elimination, partial redundancy elimination, procedure inlining, loop unrolling, etc.).

Ideally, each transformation of the computer program should be chosen to obtain maximum efficiency of the resulting executable binary code. Static analysis performed on the code at compile time can produce great improvements, but compile time indeterminacies prevent the attainment of maximum efficiency. Thus, dynamic analysis attempts to minimize the non-deterministic nature of compiler speculation by gathering information about the behavior of the program during run time.

Because compile-time indeterminacies prevent the attainment of maximum efficiency, one common optimization technique is feedback directed optimization. Feedback directed optimization involves compiling a program, executing it to generate profile (or "feedback") data, and then re-compiling the program using the feedback data in order to optimize it. Such optimization often results from making frequently executed paths of the program (i.e., "hot spots" or "hot regions") execute more quickly, and making other (i.e., less frequently executed) paths execute more slowly. In essence, feedback data measures dynamic data use and control flow during sample executions in an attempt to minimize the non-deterministic nature of compiler speculation.

Two methods exists for identifying these so-called "hot regions" of a program—sampling and instrumentation.

First, sampling is the periodic measurement of the targeted computer's register contents during execution of the program binary. Sampling thus identifies where most of the time is spend during execution of a particular computer program. The drawback of sampling, however, is that it only obtains information about the behavior of the binary. It is difficult to translate this data into information about the source code or any of the series of intermediate representations that are produced during the compilation process. An example of sampling-based code analysis is described in detail in Jennifer M. Anderson et al., "Continuous Profiling: Where have all the cycles gone?", *ACM Transactions on Computer Systems*, pp. 357–390 (November 1997), which is incorporated herein by reference in its entirety.

Second, instrumentation is the insertion of extra instructions into the code during compilation in order to collect information at run time. The disadvantages of instrumentation follow from its intrusive nature. That is, instrumentation increases code size and slows down the binary execution time. Also, instrumentation may alter program behavior. From the compiler's standpoint, however, the primary advantage of instrumentation is that it provides data about the behavior of the code as it is represented at the moment of instrumentation. Conventional instrumentation schemes typically instrument the binary code of a computer program, although the source code and the intermediate representations can also be instrumented. Instrumentation provides run-time measurements for a snapshot of the code taken at the point during compilation that instrumentation was performed. An example binary instrumentation scheme is described in detail in Amitabh Srivastava and Alan Eustace, "ATOM: A System for Building Customized Program Analysis Tools," *ACM SIGPLAN Notices*, 29(6), pp. 196–205 (June 1994), which is incorporated herein by reference in its entirety.

Sampling is faster than instrumentation and can be performed by the hardware. However, once run-time data has been obtained for a particular snapshot of the code representation, maintaining and updating that data to reflect any later compiler transformations is generally less difficult than projecting data obtained from sampling backwards through the compilation transformations.

Compilers typically represent any given program (i.e., the immediate representation) by a control flow graph. Compiler optimizations performed on the program result in changes to the flow graph, so that the program is represented by many different, though semantically equivalent, flow graphs during the compilation process. The problem, however, is that feedback data gathered during sample runs corresponds to only one instance of the program's flow graph. As a result, feedback data, when mapped to the flow graph representation, is correct at only one point during compilation.

When optimizations result in transformations of the flow graph, the associated feedback data often cannot be precisely and correctly updated in the new flow graph. As the compiler continues to optimize, the discrepancies worsen, hence defeating the original intent to deterministically measure the program flow.

Therefore, what is needed is a method and computer program product, within an optimizing compiler, for precise feedback data generation and updating for compile-time optimizations. The method and computer program product should perform instrumentation on the source code of the computer program and maintain accurate feedback data especially when dealing with inlined procedures in such programming languages as C++ and when code is cloned during ceratin optimizations.

SUMMARY OF THE INVENTION

The present invention is directed to a method and computer program product for the precise feedback data generation and updating for compile-time optimizations.

The method and computer program of the present invention involve, within an optimizing compiler, accessing a first intermediate representation of the source code of a computer program, wherein the representation includes instructions instrumented into the source code. Then, the first intermediate representation is annotated with previously-gathered feedback data from several sample executions of the computer program. The feedback data is then updated according to a pre-defined propagation scheme.

The method and computer program of the present invention further involve performing an action (e.g., lowering) or optimization (particularly those which affect control flow such as dead code elimination, branch elimination, procedure inlining, loop unrolling, etc.) of the first intermediate representation annotated with the updated feedback data. This produces a transformed intermediate representation. The optimization and updating of the feedback data are repeated whereby a series of transformations is obtained and the feedback data is continuously updated. The method and computer program product of the present invention ultimately allows the compiler to produce more efficient executable program code from the first intermediate representation, thus speeding up the execution of the computer program.

An advantage of the present invention is that it provides flexibility in choosing the point during compilation to perform instrumentation and annotation.

Another advantage of the present invention is that instrumentation may be performed at multiple points through repeated compilations.

Another advantage of the present invention is that it distinguishes between feedback data known to be correct, data obtained from educated estimates, and unavailable data.

Yet another advantage of the present invention is that it provides local updating of feedback data during optimization transformations and when exact feedback values cannot be deduced, educated estimates are made, if possible.

Yet another advantage of the present invention is that it provides global propagation of known precise feedback values to replace approximate and unavailable values, global verification of feedback data after optimization to detect discrepancies, and improved instrumentation to anticipate edge cloning.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

Table of Contents

I. Overview
   A. The Present Invention
   B. Mechanics of Instrumentation
   C. Annotation and Cloning
   D. Global Frequency Propagation II. Detailed Operation
   A. Frequency Values
   B. Local Frequency Updates
   C. Cloning Annotated Edges
   D. Global Frequency Propagation
   E. Global Frequency Verification
   F. Improved Instrumentation III. Benchmark Testing of the Present Invention IV. Environment V. Conclusion I. Overview
   A. The Present Invention This present invention addresses precise feedback data generation and updating for compile-time optimizations, thus speeding up the execution of a compiled program.

Figure 1A:
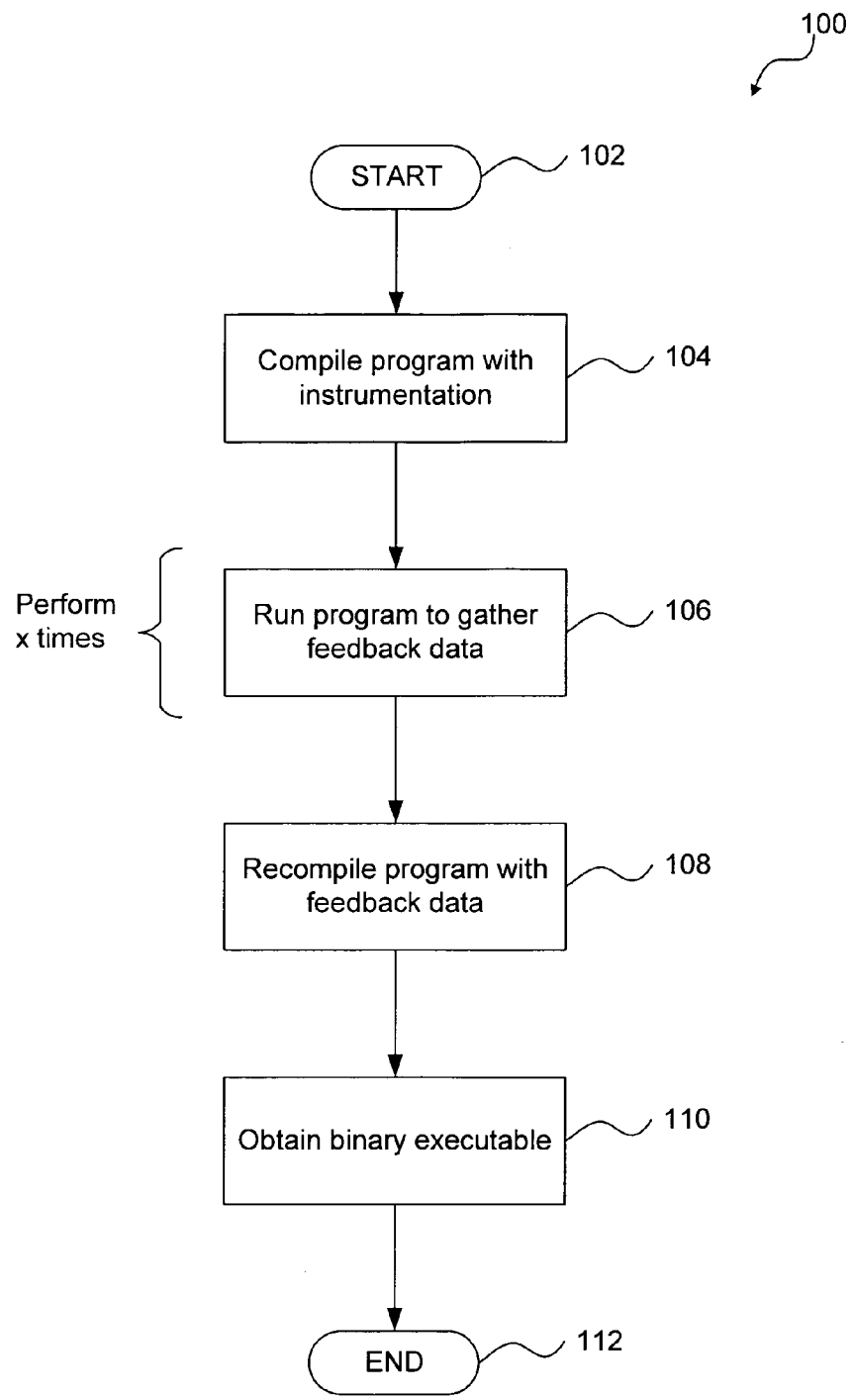
FIGS. 1A–B are flowcharts representing how the precise feedback data generation and updating of the present invention, in two alternate embodiments, fit into the code generation scheme of an optimizing compiler.

Referring to FIG. 1A, a flowchart illustrating how the precise feedback data generation and updating of the present invention, in one embodiment, fits into a code generation scheme 100 of an optimizing compiler is shown.

Code generation scheme 100 begins at step 102 with control passing immediately to step 104. In step 104, a computer program source file is first compiled with instrumentation (as explained in detail below). In an embodiment of the present invention, instrumenting during compilation of a computer program source file is activated by using a command line option such as:

cc-fb $n_1, \ldots, n_k$-instr n where $n_1 < \ldots < n_k < n$ and $n_1, n_2, \ldots, n_k$ indicate at what points to annotate with feedback data, and n indicates at what point to instrument. (During a particular pass of the compiler, feedback data can be loaded multiple times, but instrumentation should only occur once.)

In step 106, the resulting binary executable of the computer program is run several (i.e., x) times with several sets of sample data, each generating a file of feedback data. In step 108, the computer program source code is re-compiled using a precise feedback data generation and updating process of the present invention described in detail below. This produces, in step 110, a binary executable that is more efficient than those yielded by conventional optimizing compilers. Code generation scheme 100 then ends as indicated by step 112.

Figure 2:
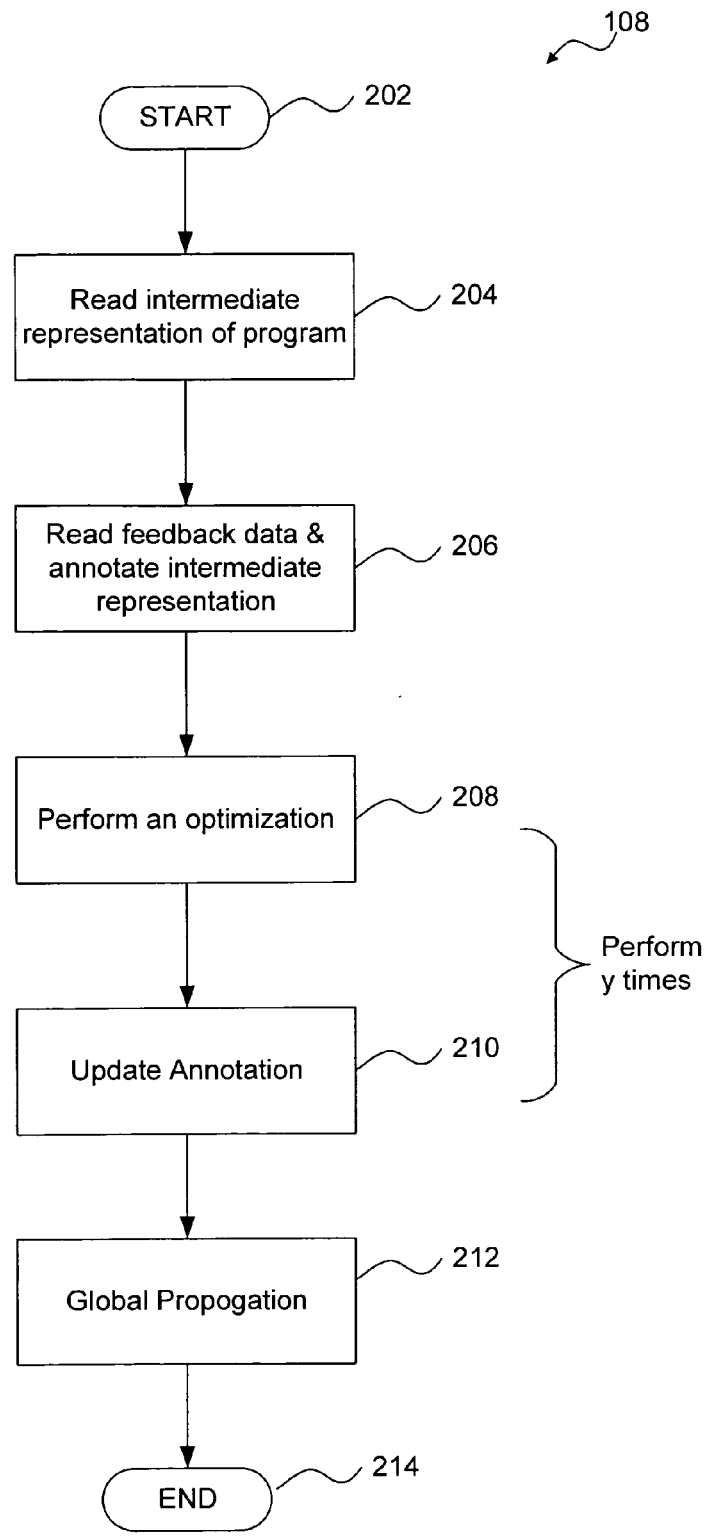
FIG. 2 is a flowchart representing the precise feedback data generation and updating scheme according to an embodiment of the present invention.

Referring to FIG. 2, a flowchart representing the precise feedback data generation and updating process 108, according to an embodiment of the present invention, is shown. The precise feedback data generation and updating process 108 begins at step 202 with control passing immediately to step 204. In step 204, the intermediate representations of the program source code are read by the optimizing compiler. In step 206, the feedback data generated in step 106 of the code generation scheme 100 is read and the intermediate representations are annotated. In step 208, the compiler performs an optimization or other action (e.g., lowering) that results in a transformation of the intermediate representations. Then, in step 210, the annotations of the intermediate representations are locally updated to reflect the results of the transformation performed in step 208. As indicated in FIG. 2, steps 208 and 210 may be repeated several (i.e., y) times, as the compiler performs any of the several types of optimizations—particularly those which affect control flow (e.g., dead code elimination, branch elimination, procedure inlining, loop unrolling, etc.). Then in step 212, global frequency propagation is performed (as explained in detail below). The precise feedback data generation and updating process 108 then ends as indicated by step 214.

Figure 3A:
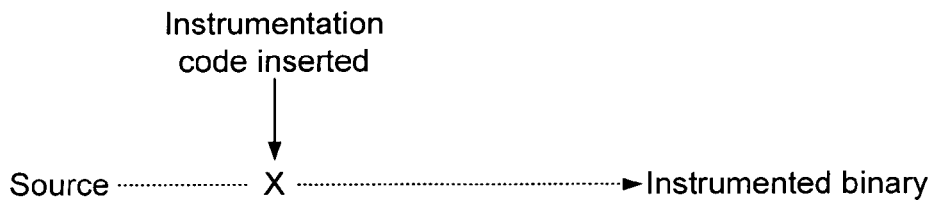
FIGS. 3A–E are block diagrams illustrating the compilation of a computer program according to an embodiment of the present invention.
Figure 3B:
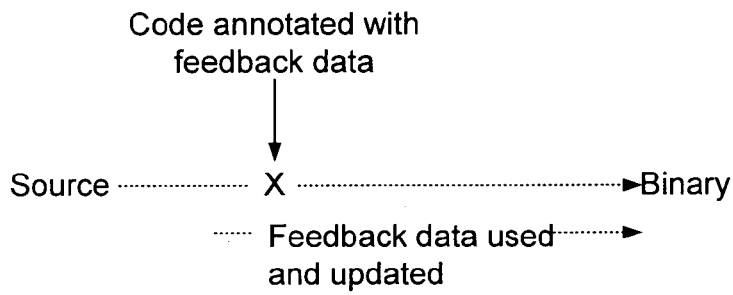

Referring to FIGS. 3A–B, an overview of the present invention's compilation 100 of a computer program source file is further explained.

Using feedback requires at least two compilation passes. During the first pass (step 104), instrumentation instructions are inserted into one of the series of intermediate representations, at some chosen stage, producing a binary executable. This is shown in FIG. 3A. Next, the binary is run one or more times with representative sample input data (step 106). In addition to its normal execution behavior, the binary executable will generate a file of feedback data.

The source code is then re-compiled with annotation turned on (step 108). When the compilation reaches the point at which instrumentation previously occurred, the file of feedback data is read and the current code representation is annotated with the frequency counts obtained during the runs of the instrumented binary (step 206). This is shown in FIG. 3B. During the remainder of the compilation process, the feedback data is available to supplement static analysis, leading to more educated decisions regarding the most optimal optimizing transformations (steps 208–210).

Code annotated with feedback data requires additional work to update the feedback data during code transformations that affect control flow. Some transformations, especially those that result in the cloning (i.e., duplication) of code, cause an unavoidable loss of accuracy in the feedback data. Thus, in one alternate embodiment of the present invention, multiple compilation passes are used.

Figure 1B:
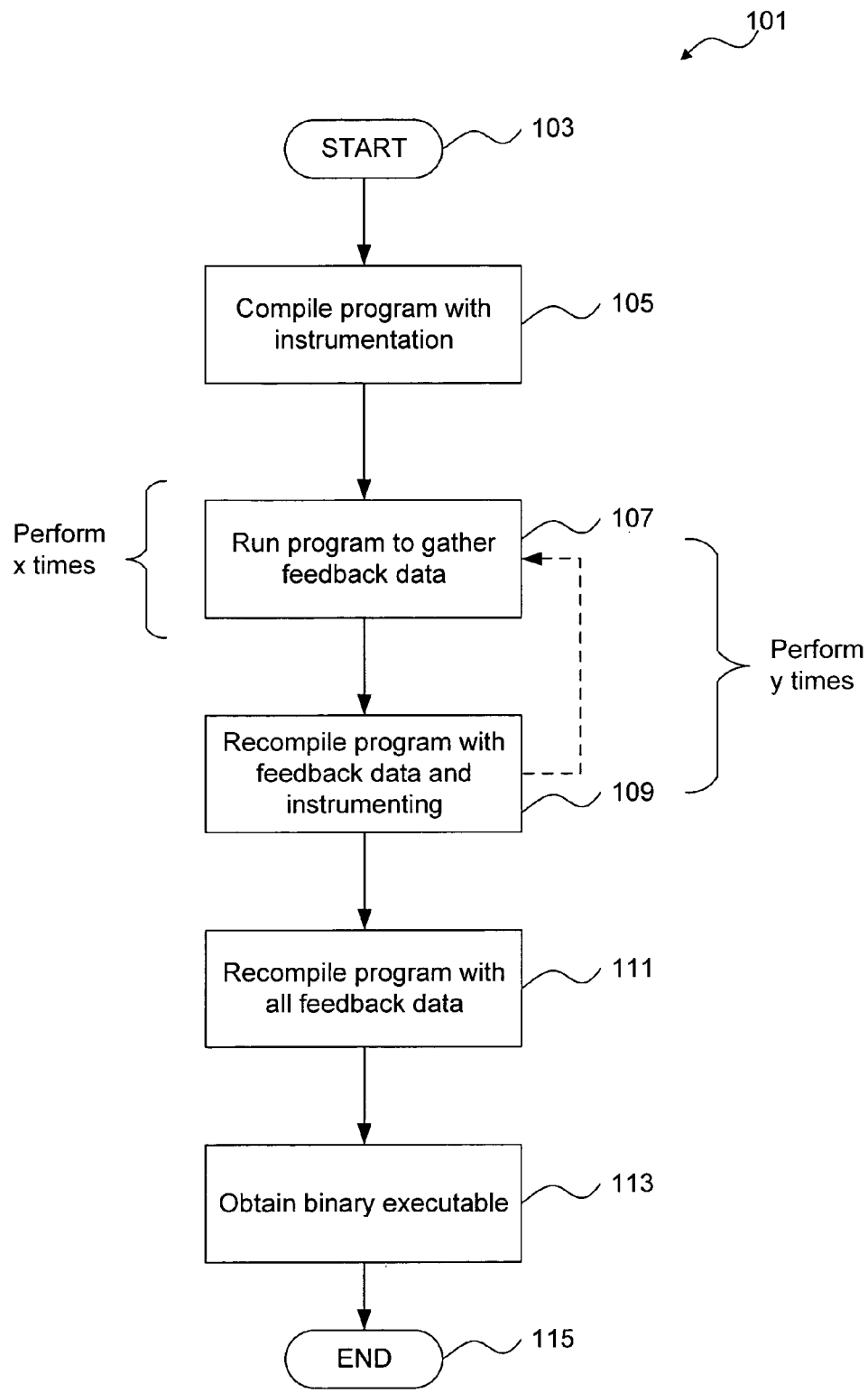

This alternate embodiment is shown in FIG. 1B, which is a flowchart illustrating how the precise feedback data generation and updating of the present invention, fits into a code generation scheme 101 of an optimizing compiler. Code generation scheme 101 begins at step 103 with control passing immediately to step 105.

In step 105, a computer program source file is first compiled with instrumentation (as explained with reference to step 104 of FIG. 1A). In step 107, the resulting binary executable of the computer program is run several (i.e., x) times with several sets of sample data, each generating a file of feedback data. In step 109, the computer program source code is re-compiled using the feedback data and instrumented at a later point then in step 105. Then, code generation scheme 101 may return to step 107 where the resulting binary executable of the computer program is again executed several (i.e., x) times with several sets of sample data, each generating a file of feedback data. The "loop" of performing steps 107 and 109 may be run several (i.e., y) times, where the code is instrumented at a later point then in the previous iteration. (Note that y≧0, and is independent of x.)

In step 111, the program is re-compiled a final time with all the feedback data generated during the performance of step 109. This produces, in step 113, a binary executable that is more efficient than those yielded by conventional optimizing compilers. Code generation scheme 101 then ends as indicated by step 115.

Figure 3C:
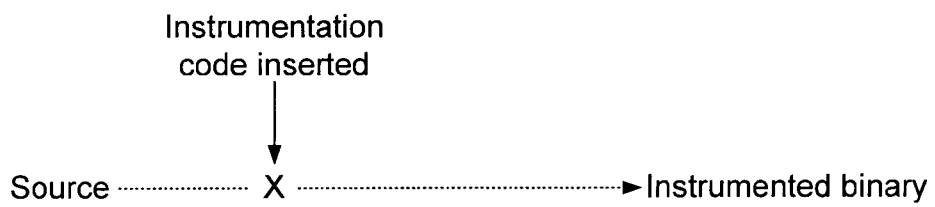
Figure 3D:
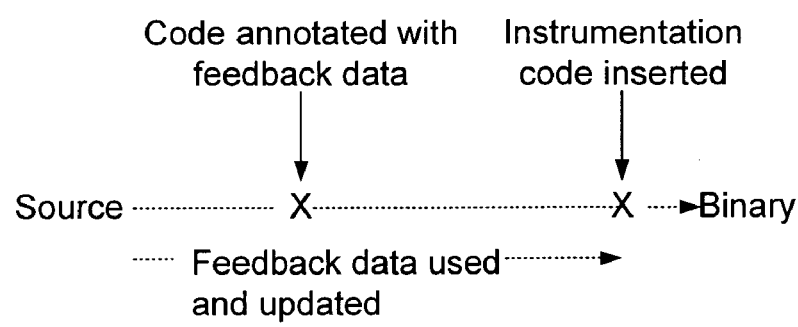
Figure 3E:
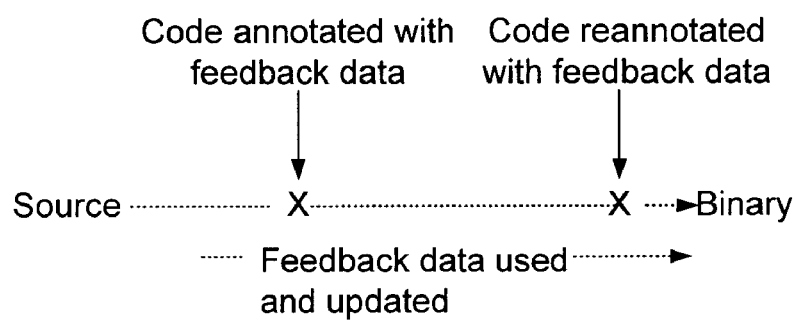

Referring to FIGS. 3C–E, an overview of the present invention's compilation 101 of a computer program source file is further explained. First, instrumentation is inserted early during the first compilation pass. This is shown in FIG. 3C. Then, instrumentation is inserted late during the second compilation pass. This is shown in FIG. 3D. For the final (third) pass, accurate feedback data would then be available for both the early and late stages of compilation. This is shown in FIG. 3E.

B. Mechanics of Instrumentation

In an embodiment of the present invention, an optimizing compiler uses a collection of trees as the intermediate code representation. That is, in an embodiment, a tree is used as the intermediate code representation for each procedure within the program source code being compiled. The tree nodes represent operators, identifiers, and constant values.

In order to correlate the feedback data with the code, instrumentation and annotation must be performed on identical code snapshots. Consequently, during the two passes, the compiler must be run with the same flags up to the moment of instrumentation and annotation, and all transformations up to that point must be deterministic.

The correlation between feedback data and code is made by assigning identification numbers to all instrumented instructions. At the moment of instrumentation, a pass is made through the current code tree. All instructions affecting control flow (including branches, loops, and procedure calls) are assigned identification numbers in the order they are encountered, and the instrumentation code is inserted. When the instrumented binary is executed, the resulting feedback data file contains the assigned identification numbers along with the frequency counts.

During later compiler passes, at the moment of annotation, a pass is again made through the current code tree, in the same order as during instrumentation. The identification numbers are again computed, and must match the numbers assigned during instrumentation. The frequency values can now be read from the feedback data file, and the identification numbers enable the values to be matched up with the correct instructions. Some examples of code instrumentation are given in TABLE 1.

TABLE 1

| INSTRUMENTATION | EXAMPLE | |
|---|---|---|
| Branch | if (<test_expr>) { ... } | —> t = <test_expr>;<br>count_branch(<branch_id>, t);<br>if (t) { ... } |
| Logical AND (&&) or OR (\|\|) Operator | <test1> && <test2> | —> <test1> && (t = <test2>,<br>count_and(<and_id>,t), t); |
| Switch Operator | switch(<expr>) { ... } | —> t = <expr>;<br>count_switch(<switch_id>, t);<br>switch (t) { ... } |
| Loop | while (<test>) { ... } | —> count_loop_entry(<loop_id>);<br>while (<test>) {<br>count_loop_body(<loop_id>);<br>...<br>} |
| Procedure Invocation | call <procedure>; | —> count_call_in(<call_id>);<br>call <procedure>;<br>count_call_out(<call_id>); |

C. Annotation and Cloning

During the annotation pass of the compiler (step 206), the code representation is annotated with control flow frequencies read from the feedback data file. In order to guarantee the correspondence between the current state of the code and the measured feedback data, annotation must occur at the same point during compilation and on the same code representation that instrumentation was performed.

Compilation continues after annotation, and the annotated feedback data is available to guide the transformation decision analysis. Later transformations alter the code structure, requiring the feedback data to be updated. The greatest challenges are posed by transformations which result in the cloning of code, which are fairly common. For example, inlined procedures that have more than one invocation require cloning. Loops are commonly lowered into two conditional jumps, with the test expression cloned as shown in TABLE 2.

TABLE 2

| while (<test>) { <body> } → | if (! <test>) goto L2;<br>label L1:<br><body><br>if (<test>) goto L1;<br>label L2: |
|---|---|

Figure 4A:
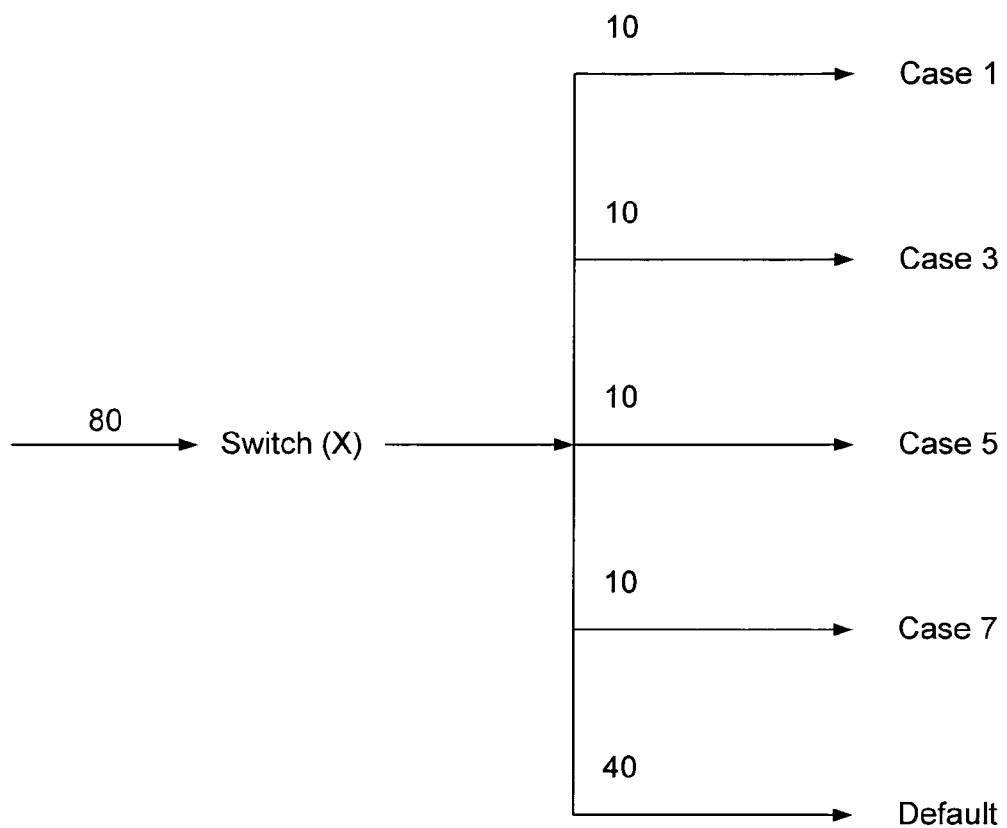
FIGS. 4A–C and 8 are block diagrams illustrating the annotation phase of compiling a computer program according to an embodiment of the present invention.
Figure 4A:
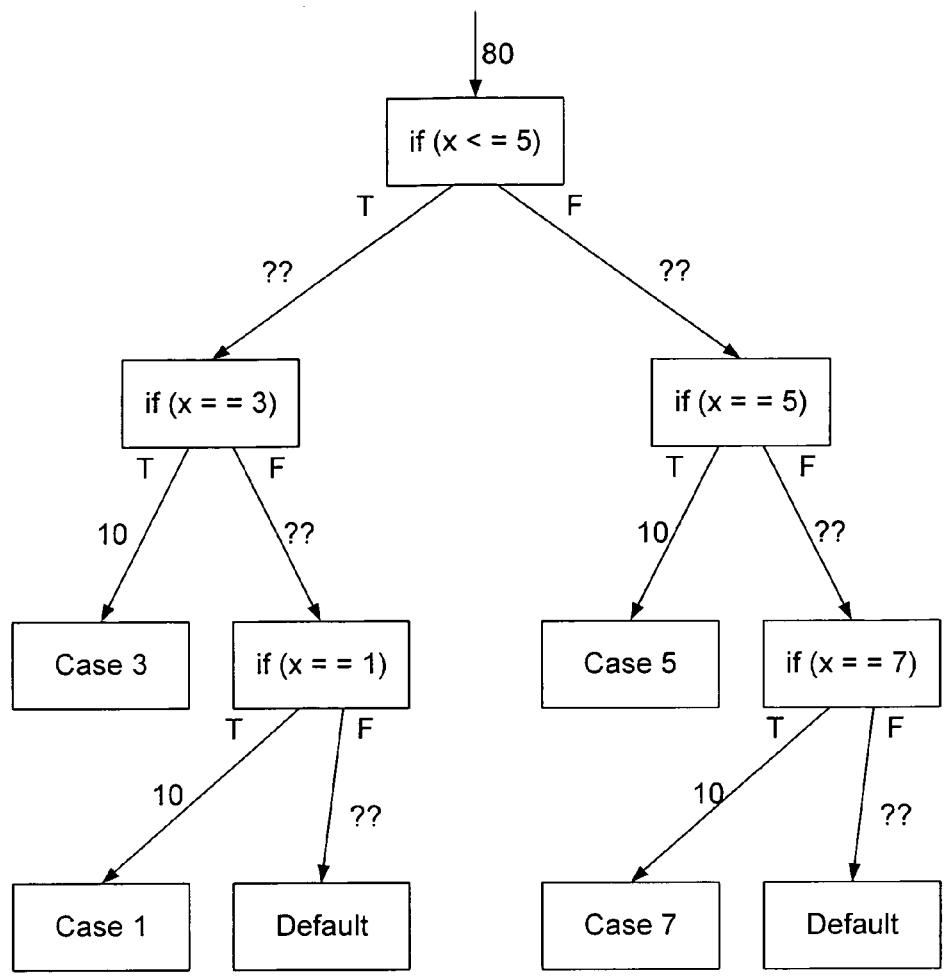
Figure 4A:
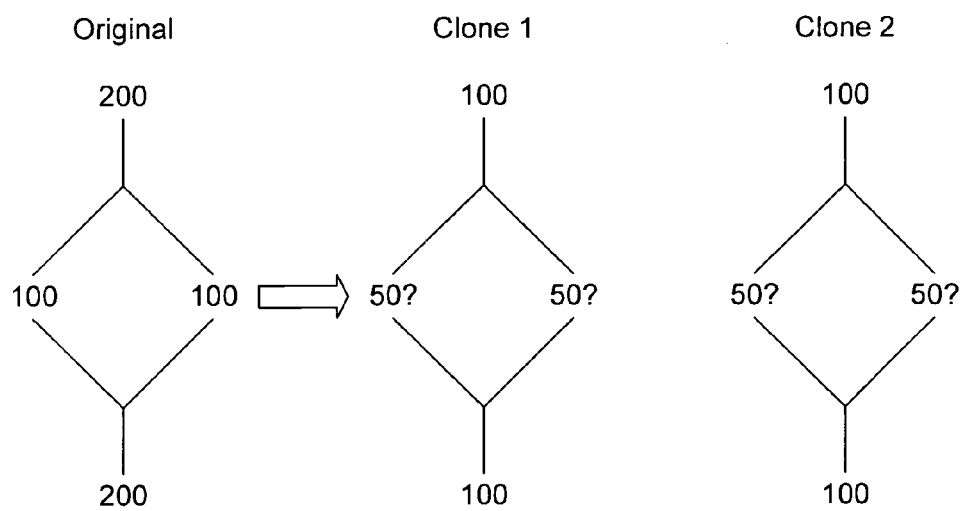

Switch statements are sometimes lowered into "if" statements organized into a binary search. Consequently, the default branch is split into multiple branches. Knowing the frequency of the default branch is not adequate to compute the frequencies of all the resulting edges as shown in FIG. 4A. The default frequency is split among two paths. Consequently, none of the if-branches have complete frequency data. (This could be improved by collecting more detailed data on the "default" branch.)

Figure 4B:
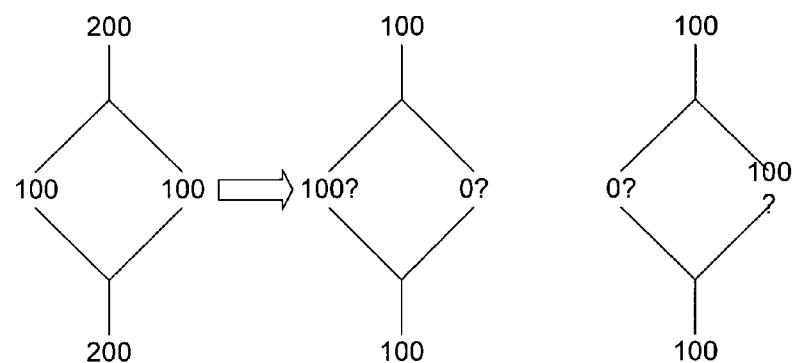

The problem posed by code cloning is the duplication of edges in the control flow graph. The frequencies assigned to these edges must be divided up between the cloned edges, but it is not known which frequency counts correspond to which of the two clones. In the example shown in FIG. 4B, a branch is being cloned. From the context, it can be determined that the incoming and outgoing frequencies should be divided evenly between the resulting clones, but no knowledge is available indicating how the two branch frequencies should be distributed. Both distributions shown are possible.

Figure 4C:
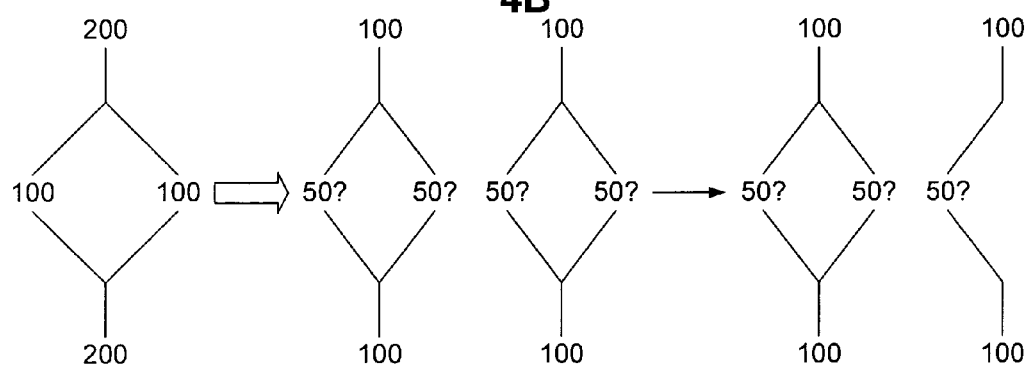

The cloning of frequency data is aggravated by dead code elimination, which may eliminate branches if analysis proves the branch condition to be a constant value. As shown in FIG. 4C, the second branch now has incompatible frequency values, and the first branch values can be deduced to be incorrect. On the other hand, dead code elimination does present an opportunity to correct an earlier error in the distribution of frequencies during cloning.

II. Detailed Operation

The present invention allows an optimizing compiler to reduce the loss of accuracy in feedback data due to optimizations, such as code cloning, by implementing six measures: (A) Distinguishing between feedback data known to be correct, data obtained from educated estimates, and unavailable data; (B) Local updating of feedback data during optimization transformations; and when exact feedback values cannot be deduced, educated estimates are made, if possible; (C) Global propagation of known precise feedback values to replace approximate and unavailable values; (D) Global verification of feedback data after optimization to detect discrepancies; (E) Local invalidation of incorrect feedback data for later optimizations; and (F) Anticipating common instances of edge cloning and instrumenting for the frequency counts of the cloned edges. Each of these is discussed in more detail below.

A. Frequency Values

A frequency value counts the number of times that a particular branch was taken or event occurred during a set of instrumented trial runs of a program. In an embodiment of the present invention, frequency values are stored as 64-bit float values, which can have one of the following values: an EXACT nonnegative float value, a GUESS nonnegative float value, UNKNOWN, UNINIT, or ERROR.

EXACT values give a precise count of the number of times that a particular control flow graph edge was traveled during the program's instrumentated executions. GUESS values are educated estimates of the count, usually introduced by code cloning. Both EXACT and GUESS values are stored as 64-bit float values in order to permit scaling and counts that would overflow integer types. The examples presented herein use the symbols "!" and "?" to distinguish between EXACT and GUESS frequencies, respectively (see FIG. 4).

UNKNOWN values may be introduced if some portions of a program have not been instrumented (e.g., separately compiled libraries). UNINIT values represent uninitialized frequency values and are used to help detect compiler transformations that do not properly update feedback. ERROR values are used to signal illegal frequency computations, such as division by zero or subtraction of a larger value from a smaller value.

B. Local Frequency Updates

Any compiler transformation affecting control flow is responsible for updating edge frequency counts. These updates are local in that they only involve frequencies in the immediate context of the transformation. Some transformations introduce edges whose frequencies cannot be immediately deduced without examining the wider context. These frequencies are deliberately left uninitialized, to be filled in during a later pass of global frequency propagation. For example, in the C programming language expression "p && q", the logical AND operator is annotated with three frequency counts as shown in TABLE 3:

TABLE 3

| FREQUENCY COUNT | EXPLANATION |
| --- | --- |
| freq_left | Number of times that p evaluated to false |
| freq_right | Number of times that p evaluated to true and then q evaluated to false |
| freq_neither | Number of times that both p and q evaluated to true |

Figure 5:
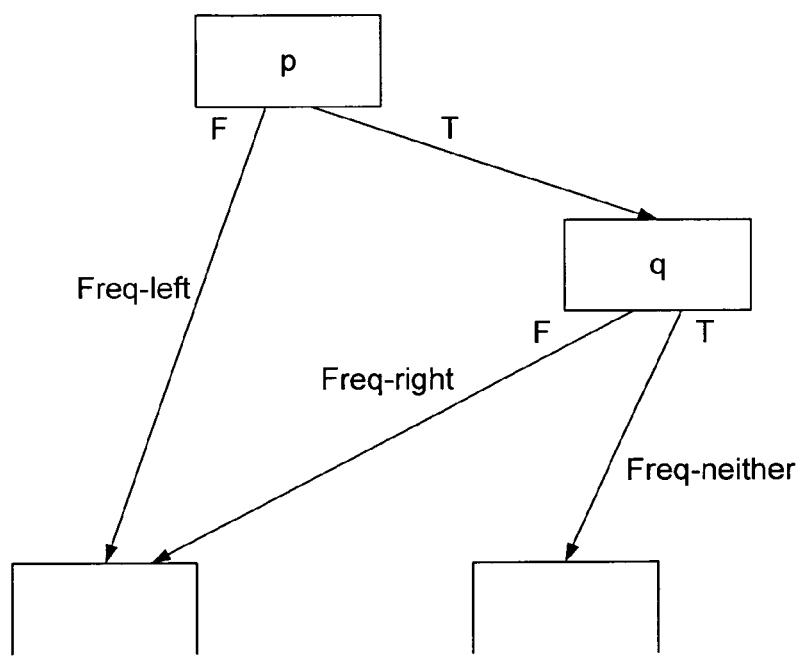
FIG. 5 is a block diagram illustrating the frequency counts that are annotated during the compiling a computer program according to an embodiment of the present invention.

The expression "p && q" may be lowered into a pair of nested branches as shown in FIG. 5. This lowering transformation assigned the frequency UNINIT to the true branch of p. A later propagation phase will assign the proper value to the branch. This value will often equal:

freq_right+freq_neither.

In some instances, however, the expression q contains a call to a function that may fail to return. In such instances, the proper frequency value should be determined from the frequencies assigned to that function invocation, rather than the equality above.

C. Cloning Annotated Edges

A number of compiler optimizations, such as inlining and loop lowering or unrolling, involve the duplication of annotated code and, consequently, the division of edge frequency counts into two or more new edge counts. In a few cases, it may be possible to deduce the exact frequency counts for the new edges from the context, but usually educated estimates must be relied upon.

Figure 6:
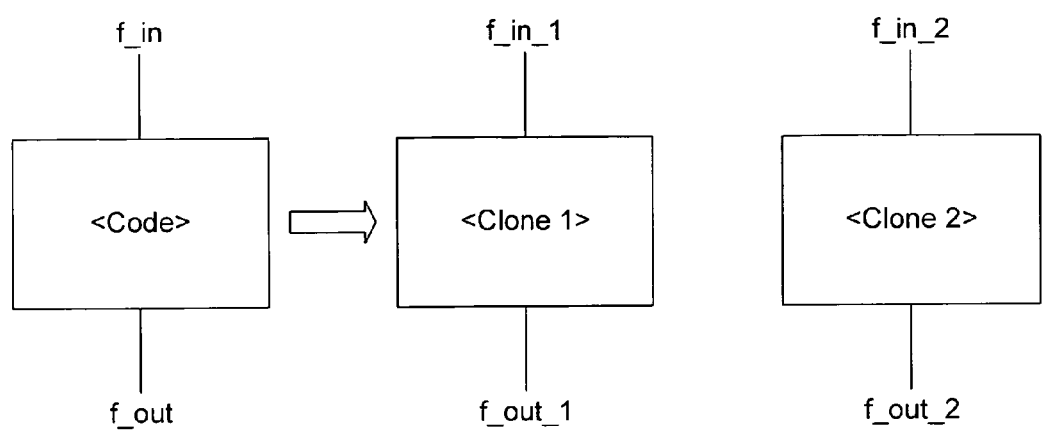
FIGS. 6–7 and 9 are block diagrams illustrating the frequency counts that are annotated to a cloned intermediate representation of a computer program according to an embodiment of the present invention.

Most cloning transformations are variations of two common cases. In the first case, the code to be cloned has a single entry and a single exit with equal frequencies, and the code is to be inlined in contexts with known entry frequencies. An example is shown in FIG. 6, where:

$f\_in = f\_in\_1 + f\_in\_2 = f\_out = f\_out\_1 + f\_out\_2$.

In this case, frequencies within <clone1> are obtained by scaling the corresponding frequencies from <code> by the factor:

$scale\_1 = f\_in\_1/f\_in = f\_out\_1/f\_out$.

Then the frequencies in <clone2> are obtained by subtracting the corresponding frequencies in <clone1> from those in <code>. All EXACT frequencies in <code> are converted to GUESS frequencies in <clone1> and <clone2>, unless either f_in_1 or f_in_2 is an EXACT zero value.

Figure 7:
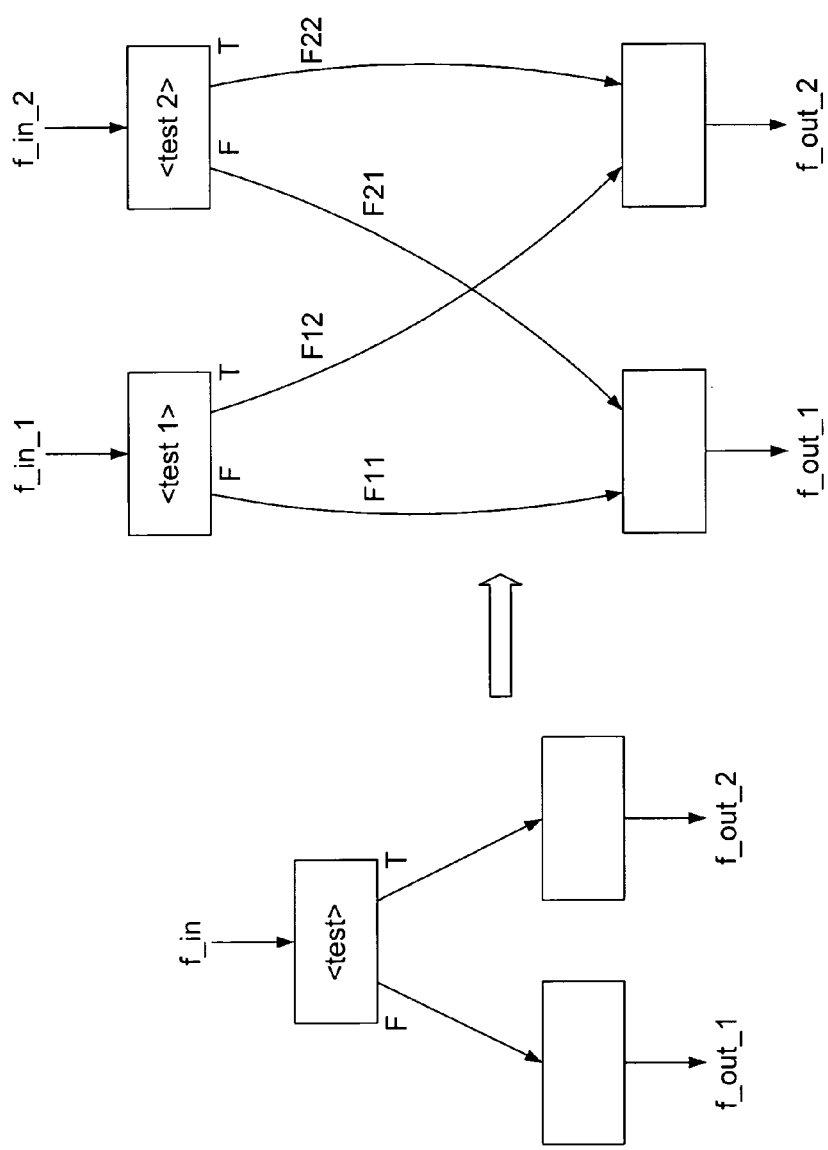

The second common case of cloning involves branch duplication. This includes the lowering of loop tests as shown in FIG. 7. In this example, only the <test> code is being duplicated, and $f\_in = f\_in\_1 + f\_in\_2 = f\_out\_1 + f\_out\_2$.

To maintain the internal consistency of the resulting graph, the sum of the incoming edge frequencies should equal the sum of the outgoing frequencies at each node. Consequently, f11, f12, f21, and f22 are chosen to satisfy:

$f11 + f12 = f\_in\_1$ $f21 + f22 = f\_in\_2$ $f11 + f21 = f\_out\_1$ $f12 + f22 = f\_out\_2$ and to maintain the ratios:

$f\_in\_1:f\_in\_2$ $f\_out\_1:f\_out\_2$

Consequently, the following equalities are set:

$f11 = f\_in\_1 * f\_out\_1/f\_in$ $f12 = f\_in\_1 * f\_out\_2/f\_in$ $f21 = f\_in\_2 * f\_out\_1/f\_in$ $f22 = f\_in\_2 * f\_out\_2/f\_in$ In the most general cloning transformation, a region of a control flow graph with incoming, outgoing, and internal edges is duplicated and then inserted into more than one new context. The new immediate context may provide known exact frequency values for the entry and exit edges. To best reflect all available information, the region's entry and exit edge frequencies are held fixed to the values determined by the context, and the outgoing edges of each node within the region are scaled together to match the total frequency of that node's incoming edges.

D. Global Frequency Propagation

Figure 8:
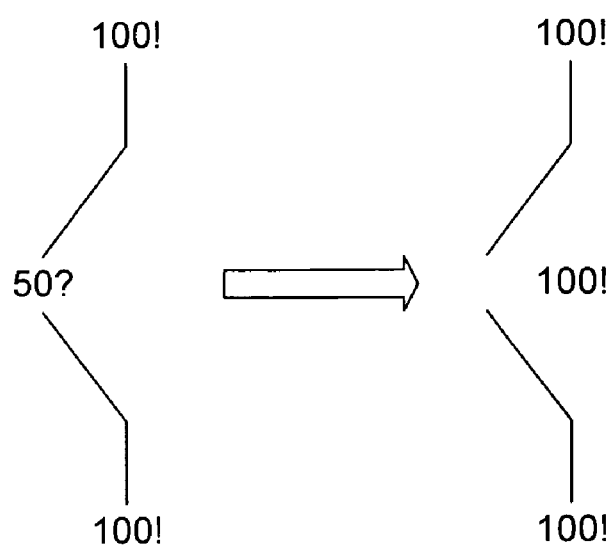

After each major phase of the compiler, frequency values are propagated along the edges of the control flow graph. When possible, unknown frequencies are replaced by estimated guesses, and guesses are replaced by exact values. In the dead code elimination example shown in FIG. 4, the guess of "50?" is replaced by the exact value of 100! as shown in FIG. 8.

In an embodiment of the present invention, the following four-step propagation scheme is employed:

1. Walk through the code representation tree and construct a control flow graph with edges identified with the code's annotated frequency values.

2. Identify each node whose total incoming edge frequency is not required to equal its total outgoing edge frequency. These nodes include procedure entry and exit nodes, and nodes corresponding to procedure calls that sometimes fail to return. These nodes are marked as EXCEPTIONs.

3. Apply the propagation rules (a–f given below) to each non-EXCEPTION node in the graph. Whenever any rule causes a change to the frequency of a node's incoming or outgoing edge, immediately apply the rules to the node at the other end of that edge, unless that node is an EXCEPTION.

4. Walk through all the nodes of the graph, and re-annotate the code with the graphs edge frequencies. The graph can then be discarded.

In an embodiment of the present invention, the following propagation rules are applied:

a. If all of the node's incoming edge frequencies are EXACT, and if all but one of the node's outgoing frequencies are EXACT, then set the remaining outgoing edge frequency to be the difference of the sum of all incoming edge frequencies and the sum of the EXACT outgoing frequencies.

b. If all of the node's outgoing edge frequencies are EXACT, and if all but one of the node's incoming frequencies are EXACT, then set the remaining incoming edge frequency to be the difference of the sum of all outgoing edge frequencies and the sum of the EXACT incoming frequencies.

c. If all of the node's incoming edge frequencies are known (GUESS or EXACT), and if all but one of the node's outgoing frequencies are known, then set the remaining outgoing edge frequency to be the difference of the sum of all incoming edge frequencies and the sum of the known outgoing frequencies.

d. If all of the node's outgoing edge frequencies are known, and if all but one of the node's incoming frequencies are known, then set the remaining incoming edge frequency to be the difference of the sum of all outgoing edge frequencies and the sum of the known incoming frequencies.

e. If all of the node's incoming edge frequencies are EXACT, and if the sum of the node's incoming frequencies equals the sum of the node's EXACT outgoing frequencies, then set the frequencies of the remaining outgoing edges to 0!.

f. If all of the node's outgoing edge frequencies are EXACT, and if the sum of the node's outgoing frequencies equals the sum of the node's EXACT incoming frequencies, then set the frequencies of the remaining incoming edges to 0!.

In a further embodiment, the optimizing compiler employing the present invention simplifies the graph data structure to increase the execution speed of the above-described four-step (i.e., steps 1, 2, 3a–f, and 4) scheme. This is done by first constructing the graph without critical edges, which enables frequencies to be assigned to nodes instead of edges. Then each frequency count is assigned from the annotated code to a different node, using more nodes if necessary. The meaning of the frequency count is recorded in the node along with a pointer to the corresponding code statement to assist code re-annotation after propagation. Second, during propagation, for each node, counts of the numbers of non-EXACT (i.e., GUESS, UNKNOWN, or UNINIT) incoming and outgoing edges, the total incoming and outgoing frequencies, and a flag indicating whether the node is an EXCEPTION is maintained.

E. Global Frequency Verification

Global frequency propagation provides an ideal opportunity to detect discrepancies in the annotated feedback data. It is impossible to guarantee that the data is correct, because cloning transformations require estimation. However, whether the frequency counts within a program unit are all initialized and consistent, can always be determined. More specifically, in an embodiment of the present invention, three error conditions can be detected: (1) During propagation, the propagation rules described above (i.e., rules a–f) can produce an ERROR frequency by subtracting a larger frequency value from a smaller one; (2) After propagation, no UNINIT or ERROR frequencies should remain in the graph; and (3) After propagation, the total incoming edge frequency of each non-EXCEPTION node should equal its total outgoing edge frequency.

If verification fails, in an embodiment of the present invention, the compiler issues a warning, but continues using the inconsistent feedback data. This is because inconsistent feedback data still produces significant improvements in the run time of the optimized binary code. The primary benefit of verification, in this instance, is identifying errors in the compiler's feedback updating code.

In an alternate embodiment, the feedback data for a portion of the graph or for the entire program unit can be invalidated and all frequency counts replaced by UNKNOWN values.

F. Improved Instrumentation

Figure 9:
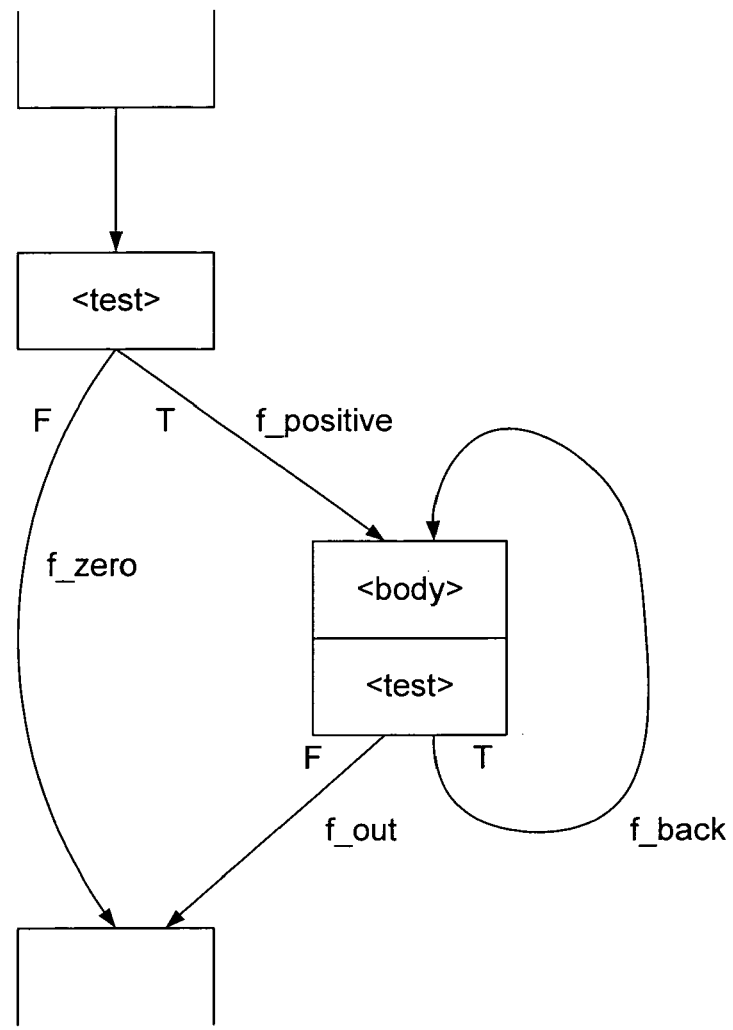

Common instances of edge cloning can be anticipated by the instrumentation so that exact counts of the cloned edge frequencies can be generated by the instrumented binary and be included in the annotation. For example, loops are commonly lowered into two branches as shown above in TABLE 2. Thus, loop instrumentation accumulates four frequency counts, representing the four outgoing edges in the two branches as shown in FIG. 9.

When the loop is subsequently lowered into a pair of if branches, the cloning of the loop <test> branch does not result in loss of frequency accuracy. Cloned subexpressions within <test>(e.g., while (p && q) { ... }) may still require estimation of frequencies, but the additional feedback data can produce more precise estimates.

III. Benchmark Testing of the Present Invention

Benchmark testing of the precise feedback data generation and updating process 108 of the present invention, implemented in a commercial compiler such as the MIPSpro™ compiler (Release 7.3) available from Silicon Graphics, Inc. of Mountain View, Calif., and targeted for a 300 MHZ R12000 processor, was performed. More particularly, compiling the SPECint95 benchmark suite and measuring the resulting run time when the benchmarks are executed using the training input data was done to evaluate the present invention.

The SPECint 95 benchmark, which is well-known in the relevant art(s), was developed by the non-profit Standard Performance Evaluation Corporation (SPEC) of Warrenton, Va. and derives from the results of a set of integer benchmarks (i.e., the geometric mean of the execution times of eight standard programs).

The benchmarks were run after compilation with and without the MIPSpro "-fb" compiler option which indicates that an instrumented executable program (as described herein) is to be generated. Such an executable is suitable for producing one or more files for feedback compilation. This enables the measurement of the overall effectiveness of the present invention. The results are shown in TABLE 4.

TABLE 4

| Benchmark | Rel. 7.3 without -fb | | Rel. 7.3 with -fb | |
| --- | --- | --- | --- | --- |
| | Run Time | Ratio | Run Time | Ratio |
| 099.go | 287 | 16.0 | 269 | 17.1 |
| 124.m88ksim | 134 | 14.2 | 107 | 17.7 |
| 126.gcc | 121 | 14.0 | 95.8 | 17.7 |
| 129.compress | 109 | 16.5 | 104 | 17.3 |
| 130.li | 167 | 11.4 | 140 | 13.6 |
| 132.ijpeg | 172 | 13.9 | 153 | 15.7 |
| 134.perl | 138 | 13.7 | 90.7 | 21.0 |
| 147.vortex | 155 | 17.5 | 101 | 26.7 |
| SPECint_base95 | | 14.5 | | 18.0 |

The above description of the benchmark testing in simulations of the present invention is illustrative only and not intended to limit the present invention.

IV. Environment

Figure 10:
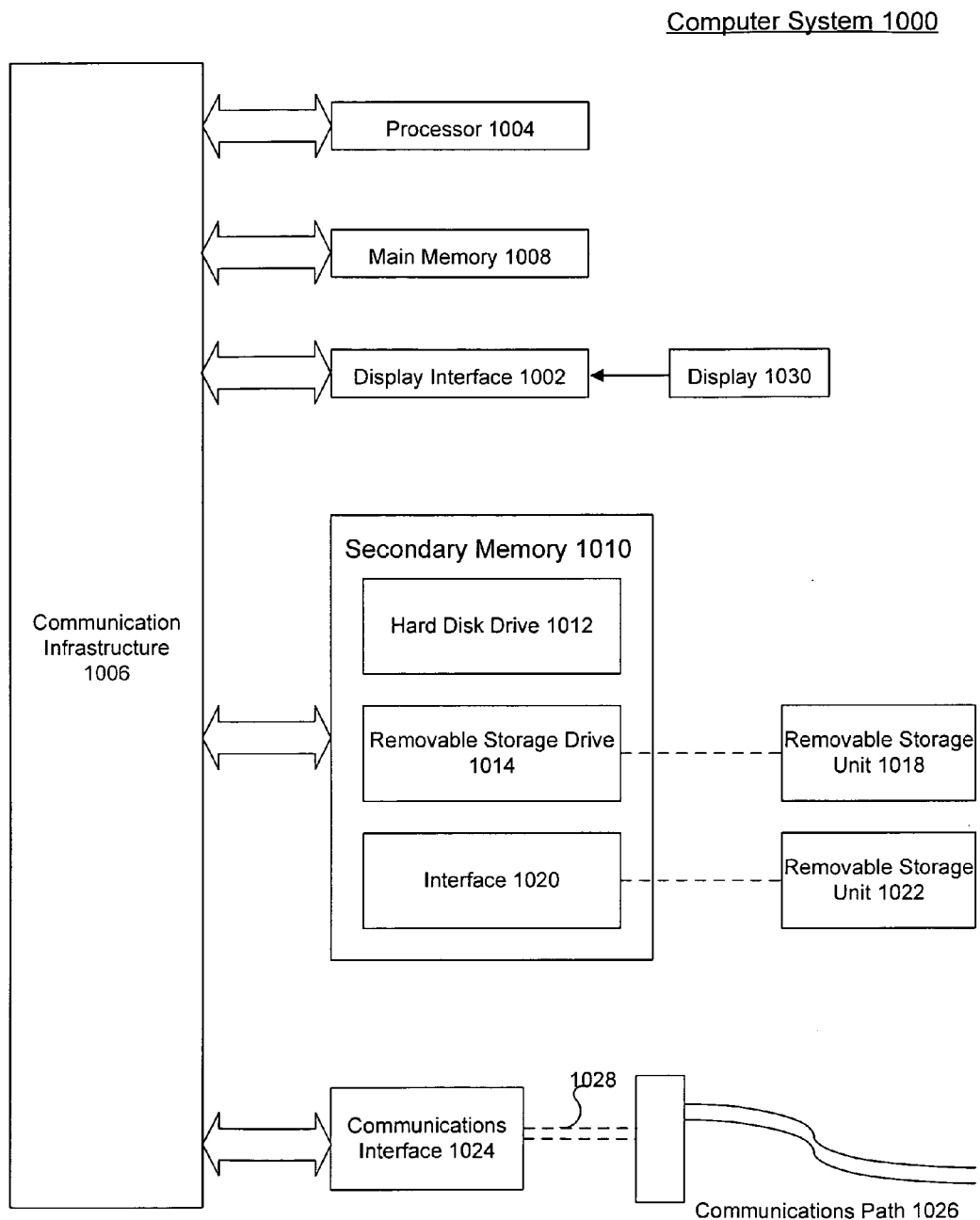
FIG. 10 is a block diagram of an example computer system for implementing the present invention.

In general, the present invention may be implemented in any compiler running on any machine, including, but not limited to, the MIPSpro compiler targeting the MIPS R12000 microprocessor or the Intel IA64 architecture. The present invention (i.e., code generation scheme 100, code generation scheme 101, the precise feedback data generation and updating process 108, or any parts thereof) may be implemented using hardware, software or a combination thereof and may be implemented in a computer system or other processing system. In fact, in one embodiment, the invention is directed toward one or more computer systems capable of carrying out the functionality described herein. An example of a computer system 1000 is shown in FIG. 10. The computer system 1000 represents any single or multi-processor computer. The computer system 1000 includes one or more processors, such as processor 1004. The processor 1004 is connected to a communication infrastructure 1006 (e.g., a communications bus, cross-over bar, or network). Various software embodiments are described in terms of this exemplary computer system. After reading this description, it will become apparent to a person skilled in the relevant art how to implement the invention using other computer systems and/or computer architectures.

Computer system 1000 can include a display interface 1002 that forwards graphics, text, and other data from the communication infrastructure 1006 (or from a frame buffer not shown) for display on the display unit 1030.

Computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well-known manner. Removable storage unit 1018, represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 1000. Such means may include, for example, a removable storage unit 1022 and an interface 1020. Examples of such may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a PCMCIA slot and card, etc. Software and data transferred via communications interface 1024 are in the form of signals 1028 which may be electronic, electromagnetic, optical or other signals capable of being received by communications interface 1024. These signals 1028 are provided to communications interface 1024 via a communications path (i.e., channel) 1026. This channel 1026 carries signals 1028 and may be implemented using wire or cable, fiber optics, a phone line, a cellular phone link, an RF link and other communications channels.

In this document, the terms "computer program medium" and "computer usable medium" are used to generally refer to media such as removable storage drive 1014, a hard disk installed in hard disk drive 1012, and signals 1028. These computer program products are means for providing software to computer system 1000. The invention is directed to such computer program products.

Computer programs (also called computer control logic) are stored in main memory 1008 and/or secondary memory 1010. Computer programs may also be received via communications interface 1024. Such computer programs, when executed, enable the computer system 1000 to perform the features of the present invention as discussed herein. In particular, the computer programs, when executed, enable the processor 1004 to perform the features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. For example, although the foregoing description addresses the invention as an intra-procedural optimization, to one skilled in the art, the invention can easily be extended to be applied inter-procedurally for even greater optimization effect.

Further, it will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for precise feedback data generation and updating during compile-time optimizations, within an optimizing compiler, comprising:

(a) accessing a first intermediate representation of source code of a computer program, wherein said first intermediate representation includes instructions instrumented into the source code of said computer program;

(b) annotating said first intermediate representation with previously-gathered frequency data from a plurality of sample executions of said computer program;

(c) performing an optimization of said first intermediate representation annotated with said frequency data, thereby producing a transformed intermediate representation;

(d) updating said frequency data to maintain accuracy of said frequency data during compilation in a direction of increasing exactness of frequency data based on the transformed intermediate representation caused by the optimization; and (e) repeating steps (c) and (d) at least once during the same compilation pass.

2. The method of claim 1, wherein step (c) comprises the step of performing at least one of the following optimizations:

(i) dead code elimination;
(ii) dead store elimination;
(iii) branch elimination; and
(iv) code transformation.

3. The method of claim 1, wherein said first intermediate representation is a tree corresponding to a procedure within the source code of said computer program.

4. The method of claim 3, wherein step (b), comprises the steps of:

(i) constructing a control flow graph from said tree; and
(ii) annotating a frequency value to an edge of said control flow graph, wherein said frequency value corresponds to the number of times that said edge was traversed during said plurality of sample executions of said computer program.

5. The method of claim 4, wherein said frequency value annotated to said edge of said control flow graph is one of the following:

(a) EXACT;
(b) GUESS;
(c) UNKNOWN;
(d) UNINIT; and
(e) ERROR.

6. The method of claim 1, wherein said frequency data comprises both inexact and exact values.

7. The method of claim 1, wherein step (d) updates said frequency data from GUESS to EXACT values.

8. The method of claim 1, wherein step (d) updates said frequency data from UNKNOWN to GUESS values.

9. The method of claim 1, wherein step (d) updates said frequency data from UNINIT to GUESS values.

10. The method of claim 1, wherein said optimization is performed in a direction of decreasing exactness.

11. The method of claim 1, wherein said optimization is performed locally, and the updating is performed globally.

12. A computer program product comprising a computer usable medium having computer readable program code means embodied in said medium for causing an application program to execute on a computer that performs precise feedback data generation and updating during compile-time optimizations, within an optimizing compiler, said computer readable program code means comprising:

first computer readable program code means for causing the computer to access a first intermediate representation of source code of a computer program, wherein said first intermediate representation includes instructions instrumented into the source code of said computer program;

second computer readable program code means for causing the computer to annotate said first intermediate representation with previously-gathered frequency data from a plurality of sample executions of said computer program;

third computer readable program code means for causing the computer to perform an optimization of said first intermediate representation annotated with said frequency data, thereby producing a transformed intermediate representation;

fourth computer readable program code means for causing the computer to update said frequency data to maintain accuracy of said frequency data during compilation in a direction of increasing exactness of frequency data based on the transformed intermediate representation caused by the optimization; and fifth computer readable program code means for causing the computer to re-execute said third and fourth computer readable program code means at least once during the same compilation pass.

13. The computer program product of claim 12, wherein said first intermediate representation is a tree corresponding to a procedure within the source code of said computer program.

14. The computer program product of claim 13, wherein said second computer readable program code means comprises:

sixth computer readable program code means for causing the computer to construct a control flow graph from said tree; and seventh computer readable program code means for causing the computer to annotate a frequency value to an edge of said control flow graph, wherein said frequency value corresponds to the number of times that said edge was traversed during said plurality of sample executions of said computer program.

15. The product of claim 12, wherein said frequency data comprises both inexact and exact values.

16. The product of claim 12, wherein said fourth computer readable program code means includes:

computer readable program code means for causing the computer to update said frequency data from GUESS to EXACT values.

17. The product of claim 12, wherein said fourth computer readable program code means includes:

computer readable program code means for causing the computer to update said frequency data from UNKNOWN to GUESS values.

18. The product of claim 12, wherein said fourth computer readable program code means includes:

computer readable program code means for causing the computer to update said frequency data from UNINIT to GUESS values.

19. The product of claim 12, wherein said optimization is performed in a direction of decreasing exactness.

20. The product of claim 12, wherein said optimization is performed locally, and the updating is performed globally.

21. A method for compile-time optimization comprising:

(a) accessing a first intermediate representation of source code of a computer program, wherein the first intermediate representation includes instructions instrumented into the source code;

(b) annotating the first intermediate representation with previously-gathered global and local frequency data from a plurality of sample executions of the computer program;

(c) performing an optimization of the first intermediate representation annotated with the global and local frequency data to produce a transformed intermediate representation;

(d) updating said local frequency data to maintain accuracy of said local frequency data during compilation in a direction of increasing exactness of local frequency data based on the transformed intermediate representation caused by the optimization; and (e) repeating steps (c) and (d) at least once during the same compilation pass.

22. The method of claim 21, wherein step (c) comprises the step of performing at least one of the following optimizations:
(i) dead code elimination;
(ii) dead store elimination;
(iii) branch elimination; and
(iv) code transformation.

23. The method of claim 21, wherein the first intermediate representation is a tree corresponding to a procedure within the source code.

24. The method of claim 23, wherein step (b) comprises the steps of:
(i) constructing a control flow graph from the tree; and
(ii) annotating a global or local frequency value of the global and local frequency data to an edge of the control flow graph, wherein the global or local frequency value corresponds to the number of times that the edge was traversed during the plurality of sample executions of the computer program.

25. The method of claim 24, wherein the global and local frequency value annotated to the edge of the control flow graph is one of the following:
(a) EXACT;
(b) GUESS;
(c) UNKNOWN;
(d) UNINIT; and
(e) ERROR.

26. The method of claim 21, wherein said frequency data comprises both inexact and exact values.

27. The method of claim 21, wherein step (d) updates said frequency data from GUESS to EXACT values.

28. The method of claim 21, wherein step (d) updates said frequency data from UNKNOWN to GUESS values.

29. The method of claim 21, wherein step (d) updates said frequency data from UNINIT to GUESS values.

30. The method of claim 21, wherein said optimization is performed in a direction of decreasing exactness.

31. The method of claim 21, wherein said optimization is performed locally, and the updating is performed globally.

32. A method for compile-time optimization comprising:
(a) accessing a first intermediate representation of source code of a computer program, wherein the first intermediate representation includes instructions instrumented into the source code;
(b) annotating the first intermediate representation with previously-gathered frequency data from a plurality of sample executions of the computer program;
(c) performing an optimization of the first intermediate representation annotated with the frequency data to produce a transformed intermediate representation;
(d) updating said frequency data to maintain accuracy of said frequency data during compilation in a direction of increasing exactness of frequency data based on the transformed intermediate representation caused by the optimization; and
(e) repeating steps (c) and (d) at least once during the same compilation pass.

33. The method of claim 32, wherein step (c) comprises the step of performing at least one of the following optimizations:
(i) dead code elimination;
(ii) dead store elimination;
(iii) branch elimination; and
(iv) code transformation.

34. The method of claim 32, wherein the first intermediate representation is a tree corresponding to a procedure within the source code.

35. The method of claim 34, wherein step (b) comprises the steps of:
(i) constructing a control flow graph from the tree; and
(ii) annotating a global or local frequency value of the global and local frequency data to an edge of the control flow graph, wherein the global or local frequency value corresponds to the number of times that the edge was traversed during the plurality of sample executions of the computer program.

36. The method of claim 35, wherein the global or local frequency value annotated to the edge of the control flow graph is one of the following:
(a) EXACT;
(b) GUESS;
(c) UNKNOWN;
(d) UNINIT; and
(e) ERROR.

37. The method of claim 35, wherein the global or local frequency value annotated to the edge of the control flow graph is one of the following:
(a) GUESS; and
(b) UNKNOWN.

38. The method of claim 32, wherein said frequency data comprises both inexact and exact values.

39. The method of claim 32, wherein step (d) updates said frequency data from GUESS to EXACT values.

40. The method of claim 32, wherein step (d) updates said frequency data from UNKNOWN to GUESS values.

41. The method of claim 32, wherein step (d) updates said frequency data from UNINIT to GUESS values.

42. The method of claim 32, wherein said optimization is performed in a direction of decreasing exactness.

43. The method of claim 32, wherein said optimization is performed locally, and the updating is performed globally.

44. A method for compile-time optimization comprising the steps of:
(a) accessing a first intermediate representation of source code of a computer program, wherein the first intermediate representation includes instructions instrumented into the source code;
(b) annotating the first intermediate representation with previously-gathered estimated frequency data from a plurality of sample executions of the computer program;
(c) performing an optimization of the first intermediate representation annotated with the estimated frequency data to produce a transformed intermediate representation;
(d) updating said estimated frequency data to maintain accuracy of said estimated frequency data during compilation in a direction of increasing exactness of frequency data based on the transformed intermediate representation caused by the optimization; and
(e) repeating steps (c) and (d) at least once during the same compilation pass.

45. A method for precise feedback data generation and updating during compile-time optimizations, within an optimizing compiler, comprising:
(a) accessing an intermediate representation of source code of a computer program, wherein the intermediate representation includes instructions instrumented into the source code;

(b) annotating the intermediate representation with frequency data from a plurality of executions of the computer program;
(c) performing an optimization to produce a transformed intermediate representation;
(d) re-annotating the transformed intermediate representation, wherein step (d) comprises:
   (i) constructing a control flow graph, wherein said control flow graph includes a plurality of nodes representing portions of the transformed intermediate representation, wherein said control flow graph further includes a plurality of edges, each edge representing a relationship between one of the nodes to another node;
   (ii) applying available frequency data to an edge to set an incoming edge frequency or an outgoing edge frequency for a node;
   (iii) propagating a known edge frequency to set an unknown edge frequency for a node; and
   (iv) re-annotating the transformed intermediate representation with the edge frequencies from the control flow graph; and
   (v) repeating steps (c) and (d), at least once during the same compilation pass, wherein step (c) includes performing an optimization of the re-annotated transformed intermediate representation from step (d) to produce a transformed intermediate representation for re-annotating at a subsequent execution of step (d).

46. The method of claim 45, wherein step (d)(iii) comprises:
   (a) setting an unknown edge frequency for an outgoing edge to a difference between a sum of all known incoming edge frequencies and a sum of all known outgoing edge frequencies when all incoming edge frequencies are known and all but one of the outgoing edge frequencies are known;
   (b) setting an unknown edge frequency for an incoming edge to a difference between a sum of all known outgoing edge frequencies and a sum of all known incoming edge frequencies when all outgoing edge frequencies are known and all but one of the incoming edge frequencies are known;
   (c) setting an unknown edge frequency for an outgoing edge to zero when all incoming edge frequencies are exact values and the sum of all incoming edge frequencies equals the sum of all outgoing edge frequencies; and
   (d) setting an unknown edge frequency for an incoming edge to zero when all outgoing edge frequencies are exact values and the sum of all outgoing edge frequencies equals the sum of all incoming frequencies.

47. The method of claim 45, wherein step (d)(iii) comprises:
denoting a node as being a non-exception node when the total incoming edge frequency and the total outgoing edge frequency for the node are required to be equal.

48. The method of claim 47, wherein step (d)(iii) is only executed on the non-exception node.

49. A method for precise feedback data generation and updating during compile-time optimizations, within an optimizing compiler, comprising:
   (a) accessing an intermediate representation of source code of a computer program, wherein the intermediate representation includes instructions instrumented into the source code;
   (b) annotating the intermediate representation with frequency data from a plurality of executions of the computer program;
   (c) performing an optimization to produce a transformed intermediate representation;
   (d) re-annotating and verifying the re-annotation of the transformed intermediate representation; and
   (e) repeating steps (c) and (d), at least once during the same compilation pass, wherein step (c) includes performing an optimization of the re-annotated transformed intermediate representation from step (d) to produce a transformed intermediate representation for re-annotating at a subsequent execution of step (d).

50. The method of claim 49, wherein step (d) comprises:
evaluating a portion of the transformed intermediate representation to classify a corresponding frequency data annotation as being uninitialized or invalid.

51. The method of claim 49, wherein step (d) comprises:
evaluating a portion of the transformed intermediate representation to classify a corresponding frequency data annotation as being exact, estimated, or unknown.

* * * * *